US010271570B2

(12) United States Patent
Connell

(10) Patent No.: US 10,271,570 B2
(45) Date of Patent: Apr. 30, 2019

(54) COMPOSITIONS FOR AND METHODS OF DIET SUPPLEMENTATION

(71) Applicant: NU SCIENCE LABORATORIES, INC., Chestnut Hill, MA (US)

(72) Inventor: Mark G. Connell, Chestnut Hill, MA (US)

(73) Assignee: NU SCIENCE LABORATORIES, INC., Chestnut Hill, MA (US)

( * ) Notice: Subject to any disclaimer, the term of this patent is extended or adjusted under 35 U.S.C. 154(b) by 0 days.

(21) Appl. No.: 14/460,417

(22) Filed: Aug. 15, 2014

(65) Prior Publication Data

US 2015/0050320 A1 Feb. 19, 2015

Related U.S. Application Data

(60) Provisional application No. 61/866,448, filed on Aug. 15, 2013.

(51) Int. Cl.
*A23L 33/145* (2016.01)
*A23L 33/10* (2016.01)

(52) U.S. Cl.
CPC ............. *A23L 33/145* (2016.08); *A23L 33/10* (2016.08); *A23V 2002/00* (2013.01)

(58) Field of Classification Search
None
See application file for complete search history.

(56) References Cited

U.S. PATENT DOCUMENTS

| 2005/0042328 | A1 | 2/2005 | Nishiuchi et al. |
| 2006/0239987 | A1 | 10/2006 | Foster |
| 2007/0190223 | A1 | 8/2007 | Bordi, Jr. et al. |
| 2013/0122139 | A1 | 5/2013 | Savant et al. |
| 2013/0129838 | A1 | 5/2013 | Miller et al. |
| 2014/0135257 | A1* | 5/2014 | De Kort ................ A23L 33/19 514/1.1 |
| 2015/0150898 | A1* | 6/2015 | Connell ............... A61K 36/064 424/195.16 |

FOREIGN PATENT DOCUMENTS

| WO | WO 2007/082267 | 7/2007 |
| WO | WO 2011/064373 | 6/2011 |
| WO | WO 2011/066175 | 6/2011 |
| WO | WO 2012/068431 | 5/2012 |

OTHER PUBLICATIONS

Los Angeles Times: Wily British Eat Bananas While Foes Slip on Peels; Jan. 17, 1926 p. A4 (one page print out from ProQuest Database).*
Thrombocyte.com: 10 Facts: How Many Carbs in a Banana; Online, URLhttp://www.thrombocyte.com/how-many-carbs-in-a-banana/ accessed May 16, 2016, 10 pages.*
USSC Online: The History of the Banana: Ancient Origins to the 1800s, Online, URL<http://cwh.ucsc.edu/bananas/Site/Early% 20History%20of%20the%20Banana.html> , 3 pages, accessed May 16, 2016.*
The Lady Bites, "Banana and MARMITE on Toast", <URL:http:// theladybites.co.uk/2012/04/banana-and-marmite-on-toast/>, Apr. 5, 2012, accessed Jul. 27, 2017, 3 pp.*
Sanitarium Health & Wellbeing "MARMITE™ Nutrition " <URL:https://marmite.co.nz/dig-deep/nutrition/>, accessed Jul. 28, 2017, 2 pp.*
Biolo et al. "Physiologic hyperinsulinemia stimulates protein synthesis and enhances transport of selected amino acids in human skeletal muscle." The Journal of Clinical Investigation, Feb. 1995, vol. 95, No. 2, pp. 811-819.
Biolo et al. "Insulin action on muscle protein kinetics and amino acid transport during recovery after resistance exercise." Diabetes, May 1999, vol. 48, No. 5, pp. 949-957 (Abstract Only).
Boirie et al. "Differential Insulin Sensitivities of Glucose, Amino Acid, and Albumin Metabolism in Elderly Men and Women," The Journal of Clinical Endocrinology & Metabolism, Feb. 2001, vol. 86, No. 2, pp. 638-644.
Burke et al. "Original Research Effect of α-Lipoic Acid Combined With Creatine Monohydrate on Human Skeletal Muscle Creatine and Phosphagen Concentration," International Journal of Sport Nutrition and Exerciese Metabolism, Sep. 2003, vol. 13, No. 3, pp. 1296-1301(Abstract only).
Kau et al. "Human nutrition, the gut microbiome and the immune system," Nature, Jun. 2011, vol. 474, pp. 327-336.
Kelly "The Effect of Total Work Performed During Acute Heavy Resistance Exercise on Circulating Lymphocytes in Untrained Men," University of Connecticut, Master's Theses, May 7, 2011, 51 pages.
Khan et al. "Insulin regulation of glucose uptake: a complex interplay of intracellular signalling pathways," Diabetologia, Nov. 2002, pp. 1475-1483.
Lozupone et al. "Diversity, stability and resilience of the human gut microbiota," Nature, Sep. 2012, vol. 489, pp. 220-230.
Odoom et al. "The regulation of total creatine content in a myoblast cell line," Molecular and Cellular Biochemistry, May 1996, vol. 158, No. 2, pp. 179-188 (Abstract Only).
Streeper et al. "Differential effects of lipoic acid stereoisomers on glucose metabolism in insulin-resistant skeletal muscle," American Journal of Physiology, Jul. 1997, vol. 273, No. 1, pp. E185-E191 (Abstract Only).
Wang et al. "Insulin Unmasks a COOH-Terminal Glut4 Epitope and Increases Clucose Transport across T-Tubules in Skeletal Muscle," Journal of Cell Biology, Oct. 1996, vol. 135, No. 2, pp. 415-430.
Ziegler et al. "Treatment of symptomatic diabetic polyneuropathy with the antioxidant alpha-lipoic acid: a 7-month multicenter randomized controlled trial (ALADIN III Study). ALADIN III Study Group. Alpha-Lipoic Acid in Diabetic Neuropathy." Diabetes Care, Aug. 1999, vol. 22, No. 8, pp. 1296-1301 (Abstract Only).

(Continued)

*Primary Examiner* — Aaron J Kosar
(74) *Attorney, Agent, or Firm* — Sheridan Ross P.C.

(57) ABSTRACT

A composition for diet supplementation to improve gut microflora is disclosed. The composition includes a prebiotic source and source of nucleotides, such as an extract of yeast. Also disclosed are methods of diet supplementation that include administering compositions of the invention to an individual.

9 Claims, No Drawings

(56) References Cited

OTHER PUBLICATIONS

International Search Report and Written Opinion for International (PCT) Patent Application No. PCT/US13/45202, dated Nov. 12, 2013 14 pages.
International Preliminary Report on Patentability for International (PCT) Patent Application No. PCT/US2013/045202, dated Dec. 24, 2014 13 pages.
Official Action for U.S. Appl. No. 14/406,752, dated Jan. 25, 2016 11 pages.
Official Action for U.S. Appl. No. 14/406,752, dated Oct. 27, 2016 10 pages.
Official Action for U.S. Appl. No. 15/185,800, dated May 26, 2017 9 pages.
Official Action for U.S. Appl. No. 15/185,800, dated Nov. 30, 2017 8 pages.

* cited by examiner

COMPOSITIONS FOR AND METHODS OF DIET SUPPLEMENTATION

REFERENCE TO RELATED APPLICATION

This application claims benefit of provisional application 61/866,448, filed Aug. 15, 2013, the complete disclosure of which is incorporated herein by reference.

FIELD OF THE INVENTION

The present invention is directed to diet supplementation to improve immune function, particularly for athletes that otherwise experience immune suppression due to exercise.

BACKGROUND OF THE INVENTION

It is widely accepted that both acute and chronic exercise alter the number and function of circulating cells of the innate immune system (e.g., neutrophils, monocytes and natural killer (NK) cells). Similarly, it is agreed that a lymphocytosis is observed during and immediately after exercise, proportional to exercise intensity and duration, with the number of cells (T cells and to a lesser extent B cells) falling below pre-exercise levels during the early stages of recovery, before returning to resting values normally within 24 hours. Finally, a consensus exists that reduced levels of secretory immunoglobulin A (SIgA) are associated with increased risk for URTI during heavy training as the production of SIgA is the major effector function of the mucosal immune system providing the 'first line of defense' against pathogens. Thus, there is an ongoing need to manage and reduce the negative effects of exercise on the immune system to keep athletes healthy and performing at their highest levels.

SUMMARY OF THE INVENTION

One embodiment of the present invention is a composition for diet supplementation to improve gut microflora. The composition includes a prebiotic source and a nucleotide source. The prebiotic source can be selected from monosaccharides, disaccharides, oligosaccharides, polysaccharides and combinations thereof. For example, the prebiotic source can be selected from galacto-oligosaccharides, fructo-oligosaccharides, mannan-oligosaccharides, xylo-oligosaccharides, inulin, polydextrose, lactulose, tagatose and combinations thereof. The prebiotic source can be present in the composition in an amount between about 0.5 g and about 300 g, between about 5 g and about 150 g, or between about 8 g and about 100 g.

The nucleotide source can be a nucleotide component that is selected from RNA, DNA, and combinations thereof. For example, the nucleotide source can include an extract of a yeast, such as an extract of a yeast selected from *Saccharomyces cerevisiae* and *Candida utilis*. Further, the nucleotide source can be present in an amount between about 10 mg and about 300 mg, between about 50 mg and about 200 mg, or between about 75 mg and about 150 mg.

The composition of the present invention can be in a variety of forms that are suitable for administration. For example, the composition can be in the form of capsules, tablets, caplets, bars, chews, gels, mixable powders, liquids in ready-to-drink format, and soluble powders.

Compositions of the present invention can also include components having additional functions. For example, the compositions can include components selected from carbohydrates, proteins, polyunsaturated fatty acids, antioxidants, glutamine, ginseng, echinacea, probiotics, bovine colostrum, immunoferon, zinc, plant sterols, non-steroidal anti-inflammatory compounds, and combinations thereof.

One particular embodiment of the present invention is a composition for diet supplementation to improve gut microflora. The composition includes a prebiotic source that is selected from monosaccharides, disaccharides, oligosaccharides, polysaccharides, and combinations thereof in an amount between about 0.5 g and about 300 g. The composition also includes a nucleotide source that includes an extract of yeast in an amount between about 10 mg and about 300 mg. The composition is in a form selected from capsules, tablets, caplets, bars, chews, gels, mixable powders, liquids in ready-to-drink format, and soluble powders.

A further embodiment of the present invention is a method of diet supplementation. The method includes administering to an individual a composition that includes a prebiotic source and a nucleotide source. The method of the present invention can result in the gut microflora of the individual being improved by administration of the composition. For example, the lymphoid tissue associated with the gut mucosa can be stimulated to produce antibodies to one or more pathogen. In addition, the individual can have a lower incidence of upper respiratory infections as compared to a standard. Alternatively, the individual can have an improvement in immune system markers as compared to a standard. Individuals for whom the method of the present invention is particularly suitable include athletes who can experience immune suppression by virtue of exercise.

DETAILED DESCRIPTION OF THE INVENTION

The present invention is directed to a method for combining prebiotic food ingredients with dietary nucleotides to provide a supportive environment for the improvement of the gut microbiota, with the ultimate goal of improved immune function in adults and particularly in athletes.

Gut microbiota consists of a complex of microorganism species that live in the digestive tracts of humans. In this context gut is synonymous with intestinal, and microbiota with flora and microflora. The human body carries about 100 trillion microorganisms in its intestines, a number ten times greater than the total number of human cells in the body. The metabolic activities performed by these bacteria resemble those of an organ, leading some to liken gut bacteria to a "forgotten" organ. It is estimated that these gut flora have around a hundred times as many genes in aggregate as there are in the human genome.

Gut flora have a continuous and dynamic effect on the host's gut and systemic immune systems. The bacteria are key in promoting the early development of the gut's mucosal immune system both in terms of its physical components and function and continue to play a role later in life in its operation. The bacteria stimulate the lymphoid tissue associated with the gut mucosa to produce antibodies to pathogens. The immune system recognizes and fights harmful bacteria, but leaves the helpful species alone, a tolerance developed in infancy.

Prebiotics are defined as non-digestible food ingredients that beneficially affect the host by stimulating the composition, growth and/or activity of beneficial bacteria colonies in the colon. Prebiotics include various oligosaccharides and polysaccharides such as: galacto-oligosaccharides (GOS), fructo-oligosaccharides (FOS), mannan-oligosaccharides (MOS), xylo-oligosaccharides (XOS), inulin and polydextrose. Moreover disaccharides like lactulose and some mono-saccharides such as tagatose also function as prebiotics. Prebiotic sources of the present invention can be administered to supplement diets in products such that the amount of prebiotic delivered per serving is between about 0.5 g and about 300 g, between about 5 g and about 150 g, or between about 8 g and about 100 g. In other embodiments, the prebiotic component per serving can be present in ranges having a lower end of the range of about 0.5 g, about 1 g, about 2 g, about 3 g, about 4 g, about 5 g, about 6 g, about 7 g, about 8 g, about 9 g, about 10 g and having a higher end of the range of about 300 g, about 280 g, about 260 g, about 240 g, about 220 g, about 200 g, about 190 g, about 180 g, about 170 g, about 160 g, about 150 g, about 140 g, about 130 g, about 120 g, about 110 g, or about 100 g.

The presence of relatively low levels of dietary nucleotides in modern dietary regimes leads to a lack of modulation and lowered strength in the modern human immune system. Supplementation with a concentrated source of nucleotides can remedy this chronic down-regulated immune condition.

The term nucleotide can refer to a compound that has a nitrogenous base, a pentose sugar and one or more phosphate groups. The nitrogenous base is either a purine or a pyrimidine. Pyrimidine bases are six-membered rings, and include uracil (U), cytosine (C) and thymine (T). Purine bases have a second five-membered ring, and include adenine (A), guanine (G), hypoxanthine and xanthine. A purine or pyrimidine based linked to a pentose molecule constitutes a nucleoside. A nucleotide is a phosphate ester of a NS, and may occur in the monophosphate, diphosphate or triphosphate form. The pentose is either ribose or deoxyribose; the ribonucleotide and deoxynucleotide serve as the monomeric units of RNA and DNA, respectively. RNA and DNA are linear polymers consisting of four different nucleotides linked together by 5',3' phosphodiester bonds. Nucleotides of the present invention include any compound or composition that is a source of nucleotides, and thus, can include individual nucleotides, dinucleotides, trinucleotides and oligonucleotides (comprising up to about 50 bases), as well as longer polynucleotides.

Nucleotide sources of the present invention can comprise extracts of yeast, such as *Saccharomyces cerevisiae* (brewer's yeast) or *Candida utilis* (formerly *Torulopsis utilis* or *Torula utilis*) (produced from wood sugars as a by-product of paper production).

Suitable nucleotide sources for the present invention include commercially available ones such as nuBound Recovery Supplement (Nu Science Laboratories, Inc., Chestnut Hill, Mass.). Other commercially available products include Life Extension RNA Capsules; Bluebonnet Kosher Nucleotide Complex 300; Good N Natural RNA/DNA; VitaminLife DNA/RNA; and Country Life RNA/DNA.

Nucleotide sources of the present invention can be administered to supplement diets in products such that the amount of nucleotide delivered per serving is between about 10 mg and about 300 mg, between about 50 mg and about 200 mg, or between about 75 mg and about 150 mg. In other embodiments, the nucleotide component per serving can be present in ranges having a lower end of the range of about 10 mg, about 20 mg, about 30 mg, about 40 mg, about 50 mg, about 60 mg, about 70 mg, about 80 mg, about 90 mg, about 100 mg and having a higher end of the range of about 300 mg, about 280 mg, about 260 mg, about 240 mg, about 220 mg, about 200 mg, about 190 mg, about 180 mg, about 170 mg, about 160 mg, about 150 mg, about 140 mg, about 130 mg, about 120 mg, about 110 mg, or about 100 mg.

Without intending to be bound by theory, nucleotides that are administered as part of the present invention can play one or more of a variety of functions. Nucleotides are a key component in several major processes within the body and play key roles in many biological processes. The requirements for nucleotides may increase when recovering from major tissue injury, systemic infection or possible when liver function in suppressed. A nucleotide rich diet has been shown to result in improved immune function, improved growth and resistance to infection. Nucleotides can offset the negative hormonal response associated with metabolic or inflammatory insult, such as by demanding endurance exercise (i.e., exercise using slow twitch muscle fibers and aerobic energy pathways) and/or demanding strength and power exercise (i.e., exercise using fast twitch muscle fibers and anaerobic energy pathways).

Compositions of the present invention (e.g., compositions comprising a prebiotic source and a nucleotide source) can be administered as part of the present invention either alone or in products that comprise additional components, including carbohydrates, proteins (including protein derivatives, such as hydrolysates and amino acids), polyunsaturated fatty acids (particularly, including ω-3 polyunsaturated fatty acids), antioxidants (e.g., vitamins C and E, beta-carotene, N-acetylcysteine and butylated hydroxyanisole), glutamine, ginseng, echinacea, probiotics, bovine colostrum, immunoferon, zinc, plant sterols, and non-steroidal anti-inflammatory compounds. The present invention can be delivered in any of several different forms, including but not limited to: capsules, tablets, caplets, and other forms designed to be swallowed whole; bars, chews, gels, mixable powders and other forms designed to be incorporated in solid food; and liquids in ready-to-drink format, soluble powders and other forms designed to be consumed as a liquid.

Immune system function can be improved in accordance with the present invention. Such improvements can be measured in a variety of ways, for example, by reduction in the incidence of upper respiratory infections (URIs) as compared to a standard. A standard can be either historical for a given individual or can be an average rate of URIs for a relevant population group. Immune function also can be measured in a variety of others ways known to those skilled in the art. For examples, body samples, such as blood samples, from an athlete can be analyzed for blood cell counts, such as by conducting a complete blood count (CBC) and/or looking at one or more markers. For example, samples can be evaluated for hormones or markers thereof (e.g., catecholamines, cortisol or lactate, wherein for example, reduced levels of cortisol after exercise indicate improved function), nucleotide markers (e.g., glutamine, glutamate, or uric acid wherein increased levels indicate use of nucleotides by the body), or markers of oxidative stress (e.g., malondialdehyde (MDA) or myeloperoxidase (MPO) wherein reduced levels indicate improved function). Also, samples can be evaluated for levels of SIgA and/or natural killer (NK) cells, wherein for example, increased levels of either or both indicates improved function.

An athlete is a man or woman of any age, ranging from adolescence to old age, who engages in physical activity such as exercises, sports, or games requiring physical strength, agility, or stamina. The physical activity levels of an athlete can vary with the age, conditioning and goals of the athlete, and can range from several minutes to several hours of activity and from minor effort to highly intense exertion. In particular, the physical activity levels of athletes can be more than about 15 min/day, 30 min/day, 45 min/day, 1 hr/day, 2 hr/day, 3 hr/day, 4 hr/day or 5 hr/day. Such activity can be conducted 1, 2, 3, 4, 5, 6 or 7 days/week. Typically athletes engage in training to improve or maintain their strength, speed, power, flexibility, balance, agility and cardiovascular endurance.

The present invention includes supplementing the diet of an individual with the combination of a prebiotic source and a nucleotide source, to enhance the immune strengthening benefits, which each ingredient has alone. This invention is particularly relevant for individuals who are adolescents or adults and particularly, for athletes, who due the immunosuppressive effects of exercise, can benefit their recovery process by strengthening their immune response.

One aspect of the present invention is a composition suitable for diet supplementation to improve gut microflora that comprises a prebiotic source and a nucleotide source. The composition can be selected from the group consisting of capsules, tablets, caplets, and other forms designed to be swallowed whole; bars, chews, gels, mixable powders and other forms designed to be incorporated in solid food; and liquids in ready-to-drink format, soluble powders and other forms designed to be consumed as a liquid. The composition can further comprise additional components selected from the group consisting of carbohydrates, proteins, polyunsaturated fatty acids, antioxidants, glutamine, ginseng, echinacea, probiotics, bovine colostrum, immunoferon, zinc, plant sterols, non-steroidal anti-inflammatory compounds and combinations thereof.

Another aspect of the present invention is a method of administering a composition of the invention to an individual to supplement the diet of the individual. The method can result in improvement of the gut microflora of the individual. In particular, the improvement can be an improvement in the individual's gut and systemic immune systems, such as by stimulation of the lymphoid tissue associated with the gut mucosa to produce antibodies to pathogens.

A further method of the present invention is a method to improve exercise performance by administering a composition to an athlete engaging in exercise, wherein the composition comprises a prebiotic source and a nucleotide source. There is always a need for athletes, whether or not competitive athletes, to improve their performance in their selected athletic pursuit. The present invention, involving the administration of prebiotic- and nucleotide-containing compositions to athletes and those involved in athletic pursuits, can improve the performance of the athlete in their sport or athletic endeavor as compared to performance of the athlete in the absence of administration of compositions of the present invention.

Quantification of improved performance will of course depend on the nature of the athletic endeavor involved. For example, in the instance of a weightlifter, improved performance can be easily objectively measured for example, by the ability to perform a weightlifting exercise at either greater weights or higher repetitions. Similarly, in the case of a runner, improved performance can be measured by completing a fixed distance in a shorter time period.

In preferred embodiments of methods of the invention, such individuals are athletes that have physically exerted themselves through exercise and/or are otherwise susceptible to muscle injury, inflammation and other conditions associated with physical exertion. Such athletes are typically human athletes but can also be non-human athletes such as racehorses and racing dogs. The methods include administering a nutritional product to the athlete before and/or after the athlete has physically exerted himself/herself. The nutritional product includes a prebiotic source and a nucleotide source and optionally, can include a component selected from a carbohydrate component, a protein component, a PUFA component and combinations thereof. The various embodiments of the product components are described above.

Athletes for whom the present invention is useful can be male or female and in various embodiments, can be 20 years or older, can be 30 years or older, can be 40 years or older, can be 50 years or older, can be 60 years or older. Such athletes can be characterized, for example, as endurance athletes or as strength athletes, although a given individual can of course be in both categories. An endurance athlete, for example, typically participates in sports, exercise or similar endeavors involving the use and development of cardiovascular capability, such as long distance running, cycling, swimming, hiking, triathlon, softball, baseball, soccer, basketball, hockey, football, rugby, tennis, lacrosse and so forth. Such endurance endeavors typically involve exercise using slow twitch muscle fibers and aerobic energy pathways. A strength athlete, for example, typically participates in sports, exercise or similar endeavors involving the use and development of strength capability, such as weightlifting, sprinting, field events (e.g., shot put), football, martial arts, wrestling, boxing, etc. Such strength endeavors typically involve exercise using fast twitch muscle fibers and anaerobic energy pathways. Other relevant sports include archery, basketball, badminton, volleyball, canoeing, diving, fencing, gymnastics, handball, hockey, rowing, sailing, softball, cricket, field hockey, skateboarding, snowboarding, surfing, bowling, golf, rockclimbing, mountaineering, racquetball, squash, skiing, and skating.

Sports exist on a continuum that runs from pure strength-power sports that are short duration/high intensity (e.g., weightlifting, shotput, hammer throw, etc) to those that are pure endurance sports that are long duration/low intensity (e.g., marathon running, ultra-marathons, ironman triathlons, etc). On the strength-power end of the spectrum athletes are using predominantly fast twitch muscle fibers, which are best trained with resistance exercise, while on the endurance end of the spectrum athletes are using predominantly slow twitch muscle fibers, which are best trained with endurance exercise. Anaerobic metabolism predominates in strength-power events, while aerobic metabolism predominates in endurance sports.

The majority of sports exist along the middle of this spectrum and require bursts of effort at times followed by opportunities for recovery. As such, athletes will typically combine resistance and endurance exercises in their training to produce a balance of strength and endurance. For example, a sprinter would focus on short repeats and incorporate a relatively large component of strength (resistance) training, but would still include some longer runs in their training program. On the other hand a marathon runner would train with runs that might last several hours, including a certain number of long repeats and would minimize resistance training.

Products of the present invention can be administered before and/or after an individual has engaged in a particular form of exercise and physically exerted himself or herself. Such physical exertion is typically the participation in one or more sports described above, such as running, cycling or weightlifting. One method of measuring physical exertion is by the heart rate of the individual. For example, the product can be administered after an individual has achieved an elevated heart rate, and more particularly, achieved an elevated heart rate for at least about 15 minutes, at least about 30 minutes, at least about 45 minutes, at least about 1 hour, at least about 1.5 hours, at least about 2 hours, at least about 2.5 hours, or at least about 3 hours. In this context, an elevated heart rate can be an average heart rate during the physical exertion of at least about 80 beats per minute (BPM), at least about 90 BPM, at least about 100 BPM, at least about 110 BPM, at least about 120 BPM, at least about 130 BPM, at least about 140 BPM or at least about 150 BPM.

More particularly, the product can be administered either before, during and/or after the physical exertion. For example, the product can be administered on a chronic basis, such as daily, every other day, every third day, etc. for a period of time of at least about 1 week, at least about 2 weeks, at least about 3 weeks, at least about 4 weeks, at least about 2 months, at least about 3 months at least about 6 months or longer.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method of diet supplementation, comprising administering to an individual a serving of supplement in the form of capsules on a daily basis, wherein the serving comprises:
    an isolated prebiotic source, comprising inulin and fructooligosaccharides, present in an amount greater than about 0.5 g; and
    an isolated nucleotide source, comprising adenosine monophosphate, guanosine monophosphate, cytidine monophosphate, and uridine monophosphate, in an amount greater than about 100 mg.

2. The method of claim 1, wherein the composition further comprises an additional component selected from the group consisting of carbohydrates, proteins, polyunsaturated fatty acids, antioxidants, glutamine, ginseng, echinacea, probiotics, bovine colostrum, immunoferon, zinc, plant sterols, non-steroidal anti-inflammatory compounds and combinations thereof.

3. The method of claim 1, wherein the gut microflora of the individual is improved by administration of the supplement.

4. The method of claim 1, wherein the lymphoid tissue associated with the gut mucosa of the individual is stimulated to produce antibodies to one or more pathogen by administration of the supplement.

5. The method of claim 1, wherein the individual has an improvement in the incidence of upper respiratory infections as compared to the incidence of upper respiratory infections of that individual prior to the method of diet supplementation.

6. The method of claim 1, wherein the individual has an improvement in immune system markers as compared to immune system markers in the individual prior to the method of diet supplementation.

7. The method of claim 1, wherein the individual is an athlete.

8. The method of claim 1, wherein the prebiotic source is present in an amount greater than about 1 g.

9. The method of claim 1, wherein the isolated nucleotide source is present in an amount between about 10 mg and about 300 mg.

* * * * *